United States Patent [19]

Hyppanen

[11] Patent Number: 5,345,896
[45] Date of Patent: Sep. 13, 1994

[54] METHOD AND APPARATUS FOR CIRCULATING SOLID MATERIAL IN A FLUIDIZED BED REACTOR

[75] Inventor: Timo Hyppanen, Karhula, Finland

[73] Assignee: A. Ahlstrom Corporation, Noormarkku, Finland

[21] Appl. No.: 41,580

[22] Filed: Apr. 5, 1993

[51] Int. Cl.$^5$ .............................................. F22B 1/00
[52] U.S. Cl. ....................................... 122/4 D; 110/245
[58] Field of Search ................... 110/245; 122/4 D; 432/15, 58

[56] References Cited

U.S. PATENT DOCUMENTS

| | | | |
|---|---|---|---|
| 3,859,963 | 1/1975 | Roberts et al. | 122/4 D |
| 3,893,426 | 7/1975 | Bryers | 122/4 D |
| 4,335,662 | 6/1982 | Jones | 110/245 |
| 4,813,479 | 3/1989 | Wahlgren | 110/245 |
| 4,823,740 | 4/1989 | Ohshita et al. | 110/245 |
| 4,915,061 | 4/1990 | Garcia-Mollol | 122/4 D |
| 5,054,436 | 10/1991 | Dietz | 110/245 |
| 5,060,599 | 10/1991 | Chambert | 122/4 D |
| 5,069,171 | 12/1991 | Hansen et al. | 110/245 |
| 5,141,708 | 8/1992 | Campbell, Jr. et al. | 110/245 |
| 5,239,946 | 8/1993 | Garcia-Mollol | 122/4 D |
| 5,242,662 | 9/1993 | Toth | 110/245 |

*Primary Examiner*—Henry C. Yuen
*Attorney, Agent, or Firm*—Nixon & Vanderhye

[57] ABSTRACT

A reactor chamber of a fluidized bed reactor has an internal circulation of particles. Larger recirculated particles are prevented from contacting heat transfer surfaces by classifying particles adjacent the bottoms of the reactor chamber using a particle chamber having a barrier wall with holes or slots of a maximum dimension of less than about 30 mm. The heat transfer surfaces may be disposed in the particle chamber. Larger particles flow down the walls of the particle chamber into the reactor chamber, and some fine particles within the particle chamber are preferably recirculated back to the fluidized bed. The barrier wall is preferably the top wall of the particle chamber, and may be refractory lined with furrows, and/or may be formed of water tubes connected together by fins, with the holes or slots formed in the fins.

26 Claims, 7 Drawing Sheets

METHOD AND APPARATUS FOR CIRCULATING SOLID MATERIAL IN A FLUIDIZED BED REACTOR

BACKGROUND AND SUMMARY OF THE INVENTION

The present invention refers to a method and an apparatus for circulating solid material in a fluidized bed reactor, including a reactor chamber, having side walls defining the interior of the reactor chamber and a grid at the bottom of the reactor chamber; a gas discharge opening adjacent the upper end of the reactor chamber and a fluidized bed of solid particles in said reactor chamber, the fluidized bed having an internal circulation of solid particles.

In fluidized bed reactors, both conventional bubbling bed reactors and in circulating bed reactors, there is an internal circulation of solid bed material within the reactor chamber. The bed material is in a continuous upwards and downwards motion. The finer the solid particles the more easily they flow upwards in the reactor chamber. A fractionation of solids therefore takes place in the reactor chamber. A dense solid particle fraction, including larger objects, is formed in the lower part of the reactor chamber, whereas less dense solid particle fractions, including fine particles, are formed higher up in the reactor chamber.

It would sometimes be desirable to be able to process particles in the lower part of the reactor chamber, without having larger objects mixed therein. E.g. recovering heat from solid particles in the lower part of the reactor chamber would be easier if large objects could be prevented from reaching the heat transfer surfaces. Large objects tend to clog the heat transfer surfaces and also cause damage mechanically.

It is therefore an object of the present invention to provide a method and an apparatus for classifying solid particles within the internal circulation of solid material in a fluidized bed reactor.

It is further an object of the present invention to provide an improved method and apparatus for recovering heat from solid particles in the lower part of a reactor chamber, by minimizing pluggage of heat transfer surfaces.

In order to achieve the above objects, a method for circulating solid material in a fluidized bed reactor, having an internal circulation of solid particles, is provided in which the following steps are practiced: (a) Classifying solid particles in the internal circulation by arranging a particle chamber in the fluidized bed of solid particles, the particle chamber having at least one barrier wall having openings allowing only solid particles of a size smaller than a predetermined size to flow from the fluidized bed through the barrier wall into the particle chamber. (b) Guiding large objects, having a size bigger than the predetermined size of particles, downwardly in the reactor chamber externally of the particle chamber. And, (c) recirculating at least a portion of the particles from the particle chamber into the reactor chamber.

An apparatus for classifying solid particles in a fluidized bed reactor having an internal circulation of particles is also provided. According to the invention the reactor comprises the following elements: A particle chamber arranged in the fluidized bed of solid particles; the particle chamber having a barrier wall provided with openings, such as holes or slots, preventing solid particles of a size bigger than a predetermined size from flowing from the reactor chamber into the particle chamber; and, the particle chamber further having a wall provided with at least one opening for recirculating particles from the particle chamber into the reactor chamber.

According to a preferred embodiment of the invention heat transfer surfaces are arranged in the particle chamber. Heat is then easily and efficiently recovered from particles without large objects adversely affecting heat recovery.

The particle chamber may be arranged adjacent to a side wall or a partition wall in the lower part of the reactor chamber for classifying solid particles flowing downwardly by gravity along the walls. Then the uppermost end or roof construction of the particle chamber may form a barrier wall therein. The barrier wall may be horizontal or inclined. The barrier wall, having openings allowing only particles of a size smaller than a predetermined size to flow therethrough, prevents large objects from flowing into the particle chamber. By making the barrier wall inclined, e.g. about 30°–45° from horizontal the large objects are caused to continue to flow downwardly along the external side of the barrier wall without clogging the openings in the barrier wall.

A side wall of the particle chamber may in some embodiments form the barrier wall therein. Then particles having a horizontal momentum can flow through the openings in the barrier wall into the particle chamber.

The present invention may be used e.g. in fluidized bed combustors, where one or several particle chambers are arranged on the bottom of the combustion chamber. The particle chamber or chambers may be adjacent the side walls or partition walls in the combustion chamber or may even stand freely on the bottom. In some embodiments particle chambers may be arranged as protrusions higher up in the combustion chamber.

If the particle chambers are arranged adjacent one or several of the reactor chamber side walls, then a portion of the vertical or inclined side wall may form a common wall between the particle chamber and the reactor chamber. The particle chamber may be arranged on the inside or on the outside of the side wall part, which forms the common wall. Thereby the particle chamber may form a protrusion on the inside or outside of the reactor chamber. If the particle chamber forms a protrusion on the outside of the reactor chamber side wall, then the openings allowing particles to flow into the particle chamber are advantageously made in the portion of the side wall forming a common wall between the fine material chamber and the reactor chamber.

In hot surroundings the particle chamber may be constructed of water tube panels as is the reactor chamber itself. The tube panels may be refractory lined. The openings in the wall forming the barrier wall may then be made in fins combining adjacent water tubes or may be made by bending a water tube or two adjacent water tubes to provide a slot between the tubes. If the barrier wall is refractory lined then a furrow may be formed in the refractory lining and the openings may be made in the bottom plane of the furrow. There may be only one opening or slot in a barrier wall if the amount of particles flowing through this opening is sufficient. Usually several openings or slots are arranged in the barrier wall for securing a sufficient flow of particles.

Slots or rows of openings arranged in horizontal or inclined walls on top of the particle chamber may advantageously be arranged perpendicularly to the reactor side wall. In vertical barrier walls the slots or rows of holes are preferably arranged vertically, but may in some embodiments be arranged horizontally.

The particle chamber may e.g. reach to a level 3 to 8 meters above the grid of a circulating fluidized bed reactor, so that a rather large downwards flow of particles may be caught by the particle chamber.

There may be long particle chambers covering substantially the whole length of a side wall or several side walls, or there may only be one or two small particle chambers arranged spaced apart from each other at a side wall.

The openings in the barrier wall may in a circulating fluidized bed combustor be holes, having a diameter smaller than about 50 mm, preferably about 30 mm or smaller, or a slot having a width smaller than about 50 mm, preferably approximately 30 mm or smaller. Such openings allow only approx. round particles of a size <50 mm, preferably smaller than 30 mm, or oblong particles having a width <50 mm, or preferably smaller than 30 mm, to flow through the barrier wall.

In fluidized bed combustors the particle chamber may be used for heat recovery. Then evaporators, superheaters or other heat transfer surfaces are arranged in the particle chamber. The invention provides a possibility to run combustors at low load, even when it is impossible to get enough heating capacity in the upper regions of the combustor chamber or in external heat exchangers. The invention makes it possible to obtain a balance between superheating and evaporation for different loads or for different fuels.

Heat transfer surfaces may be arranged in any conventional manner in the particle chamber. The heat transfer may be controlled by introducing fluidizing air/gas into the fine material chamber. The fluidizing air may be used as secondary air in the combustion chamber.

A good mixing of solid material in the particle chamber is important if heat is to be recovered from the particles therein. This can be emphasized, if desired, by arranging the inlet or inlets and outlet or outlets of solid particles in opposite ends of the particle chamber.

According to a preferred embodiment of the invention particles are recirculated from the particle chamber back into the reactor chamber. The particles may be recirculated by overflow through one or several openings in the particle chamber. The openings may be arranged on one side wall of the particle chamber or there may be openings on several side walls. It is in most cases advantageous to arrange the openings far away from the inlet openings in the barrier wall, if a good mixing of particles in the particle chamber is desired.

The particles may alternatively be recirculated through a gas lock, such as narrow slot like openings disposed one above the other in a side wall in the particle chamber. The particles may also be recirculated through a gas lock of an L-valve type formed between the particle chamber and the reactor chamber. The recirculation may be controlled by fluidizing fine particles in the vicinity of the gas lock. The particles may of course also be recirculated into the reactor chamber by mechanical means, such as a screw feeder.

Fluidizing air introduced into the combustor, for control of heat transfer or for transporting particles into the particle chamber, may be used as secondary air in the combustion chamber. The particle outlet openings or the particle inlet openings allow gas to flow outward through the barrier wall countercurrently to the particle flow. The particle flow inward into the particle chamber is unstable and does not prevent gases from escaping out from the chamber.

In a circulating fluidized bed reactor bed material is discharged with the exhaust gases and separated from the gases in a particle separator. The particles are thereafter reintroduced through a particle inlet into the reactor chamber, usually into the lower part of the reactor chamber. When utilizing a particle chamber according to the present invention in a circulating fluidized bed reactor, the externally circulated bed material may be wholly or partly reintroduced into the reactor through that particle chamber. An inlet for externally circulated material is then provided in the particle chamber. If heat transfer surfaces are to be arranged in the particle chamber, then heat is recovered from both externally and internally circulating material.

Further features and advantages of the present invention will be more fully appreciated by reference to the following detailed description of the drawings, and from the appended claims.

DETAILED DESCRIPTION OF THE DRAWINGS

Figure 1:
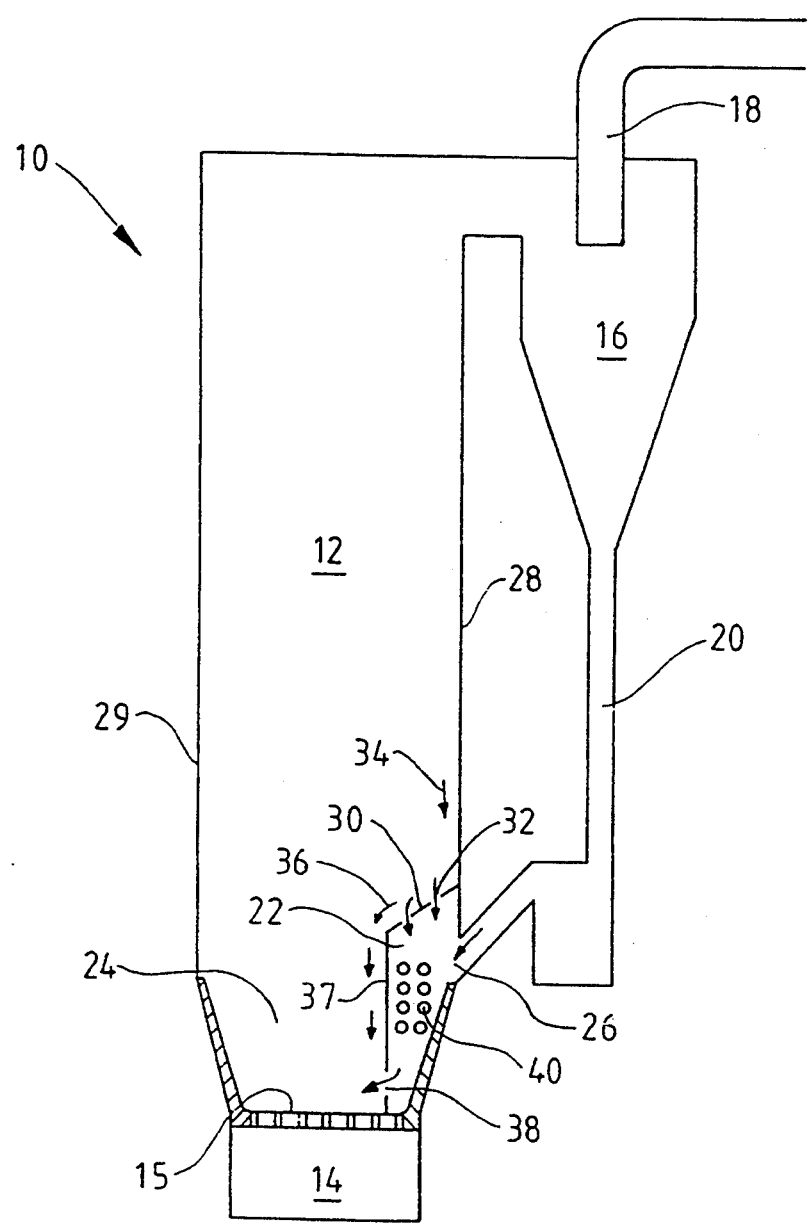
FIG. 1 is a schematic vertical cross sectional view of a circulating fluidized bed reactor constructed in accordance with a first preferred exemplary embodiment of the present invention.

FIG. 1 shows a circulating fluidized bed reactor 10 having a reactor chamber 12, a conventional windbox 14 with grid 15 for introducing fluidizing air into the reactor chamber 12, a conventional particle separator 16, a conventional gas outlet 18 and a conventional return duct 20 for recycling solid particles into the reactor chamber 12.

A particle chamber 22 according to the present invention is disposed in the lower part 24 of the reactor chamber 12. According to this embodiment the particle chamber 12 is provided in connection with an inlet 26 for particles being recycled through the return duct 20. In this way, relatively fine material discharged from the reactor 10 entrained in the flue gases is introduced into the particle chamber 22. There may be several inlets for particles being recycled and a particle chamber 22 may be connected to each of the inlets, or only to one, or some, of them.

Additionally particles flowing downwardly along a side wall 28 of chamber 12 are captured by a barrier wall 30 forming the roof of the particle chamber 22. Openings 32 in barrier wall 30 allow fine solid particles (see arrows 34) to flow through the barrier wall 30. Larger objects (see arrows 36) flow downwardly on the outside surface 37 of the particle chamber 22. The particles entering inlet 26 and openings 32 are reintroduced into the lower part of the reactor chamber through opening 38.

The opening 38 for reintroducing particles into the reactor chamber may constitute a gas lock, if necessary. The opening 38 may, e.g., be formed by narrow slots disposed on top of the other, with each slot forming an L-valve.

Heat transfer surfaces 40 are disposed in the particle chamber 22. The heat transfer surfaces 40 may e.g. be evaporator or superheater surfaces. By recovering heat from particles circulating internally in the reactor chamber 12 it is possible to generate substantial amounts of heat even at low loads.

Figure 2:
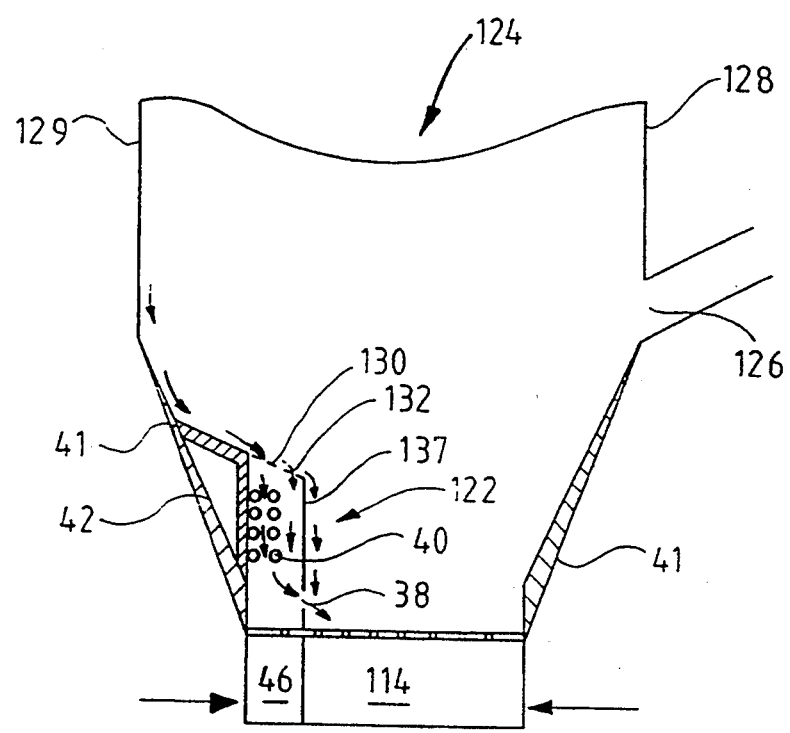
FIGS. 2 and 3 are schematic enlarged cross sectional views of the lower part of a fluidized bed reactor chamber according to other exemplary embodiments of the present invention.

FIG. 2 shows an enlarged view of the lower part 124 of another embodiment of reactor chamber according to the invention. In this embodiment components comparable to those in FIG. 1 are shown by the same reference numerals only preceded by a "1". According to this embodiment, particle chamber 122 is disposed adjacent a side wall 129 opposite to side wall 128 having the inlet 126 for recycled fine solid particles. The particle chamber 122 is disposed in the lowermost part 124 of the reactor chamber, which has inclined refractory lined walls 41. A portion 42 of the refractory lined wall 41 adjacent side wall 129 forms a side wall of the fine material chamber 122 as well. Also the barrier wall 130 and side wall 137 of chamber 122 are preferably refractory lined. The barrier wall 130 and the side wall 137 form a partition between the bottom 124 of the reactor chamber, and the particle chamber 122.

In a circulating fluidized bed reactor a dense flow of particles moves downwardly along the lowermost side walls 41, and a substantial amount of particles can be recycled through the particle chamber 122. Heat transfer surfaces 140, e.g. evaporator surfaces, are preferably disposed in the particle chamber 122. Heat transfer may be controlled by controlling the flow of fluidizing air from windbox 46, which opens into chamber 122. Also reintroduction of particles through opening 138 into the reactor chamber 112 may be controlled by controlling the flow of fluidizing air from windbox 114 in the vicinity of the opening 138.

Figure 3:
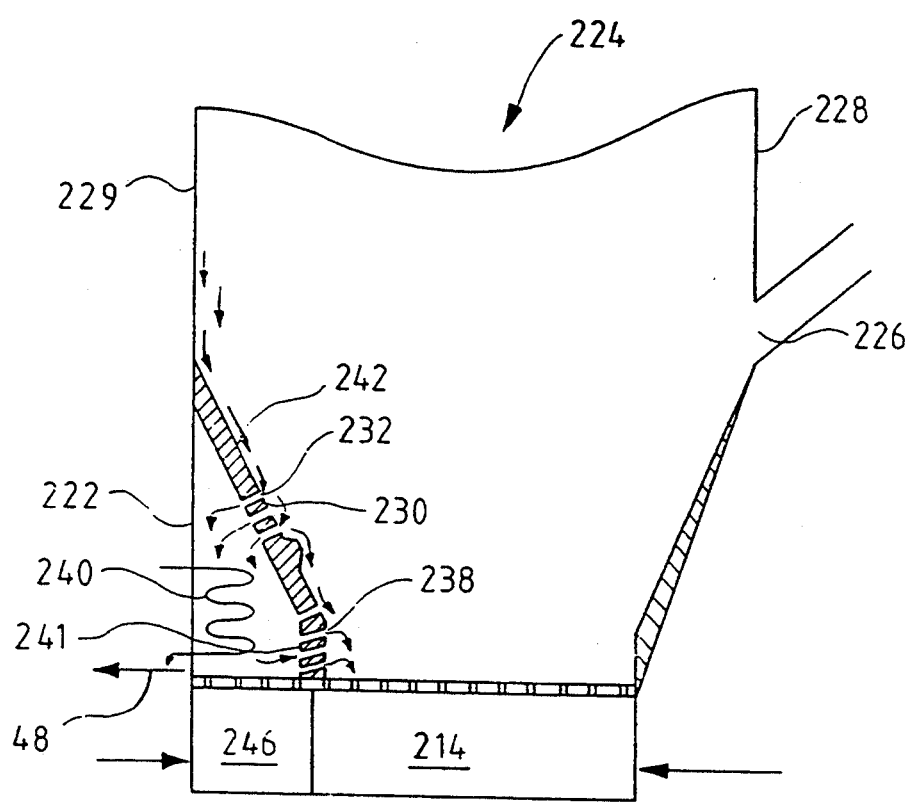

FIG. 3 illustrates a further embodiment of the present invention. In this embodiment components comparable to those in FIG. 2 are shown by the same two digit reference numeral only preceded by a "2". In this embodiment the particle chamber 222 is provided as a portion of the inclined refractory lined wall element 242 of the lower reactor chamber 224. Inlet openings 232, having a predetermined diameter or width are provided in the upper part of the refractory lined side wall portion 242, this upper part thereby forming a barrier wall 230. Outlet openings 238 are provided in the lowermost part of the refractory lined side wall 241 for reintroducing particles into the reactor chamber. Solid particles flow into the particle chamber 222 through openings 232 and are recycled into the reactor chamber through openings 238. Some particles may be discharged from chamber 222 through an outlet 48 if desired.

Figure 4:
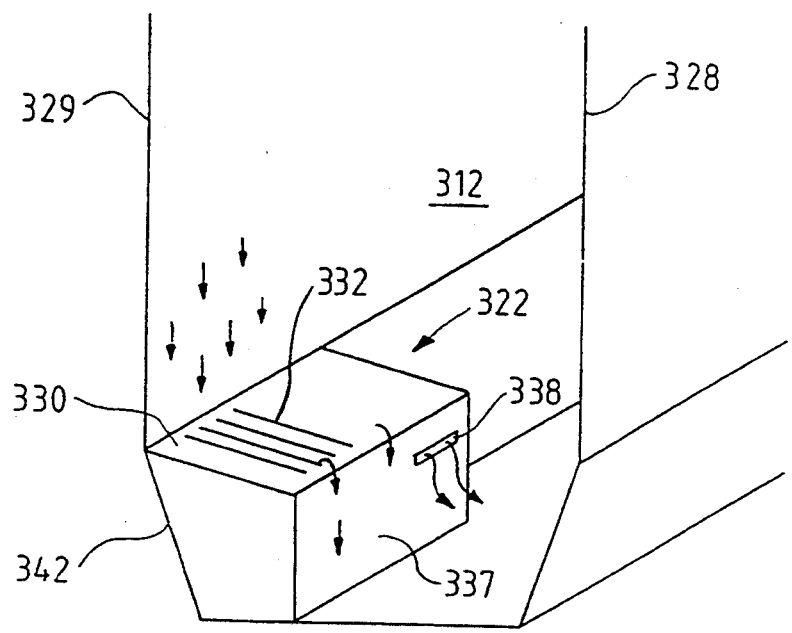
FIG. 4 is a schematic isometric view of the lower part of a fluidized bed reactor chamber according to still another exemplary embodiment of the present invention.

FIG. 4 shows an isometric view of still another embodiment according to the present invention. In this embodiment components comparable to those in FIG. 3 are shown by the same two digit reference numeral only preceded by a "3". In this embodiment the inlet openings 332 and outlet openings 338 are in opposite parts of the particle chamber 322 for providing good mixing of the material therein. The outlet opening 338 allows solid particles to flow from the particle chamber 322 into the reactor chamber 312. The particle level in the particle chamber 322 is dependent on the location of the outlet opening 338 in wall 337.

Figure 5:
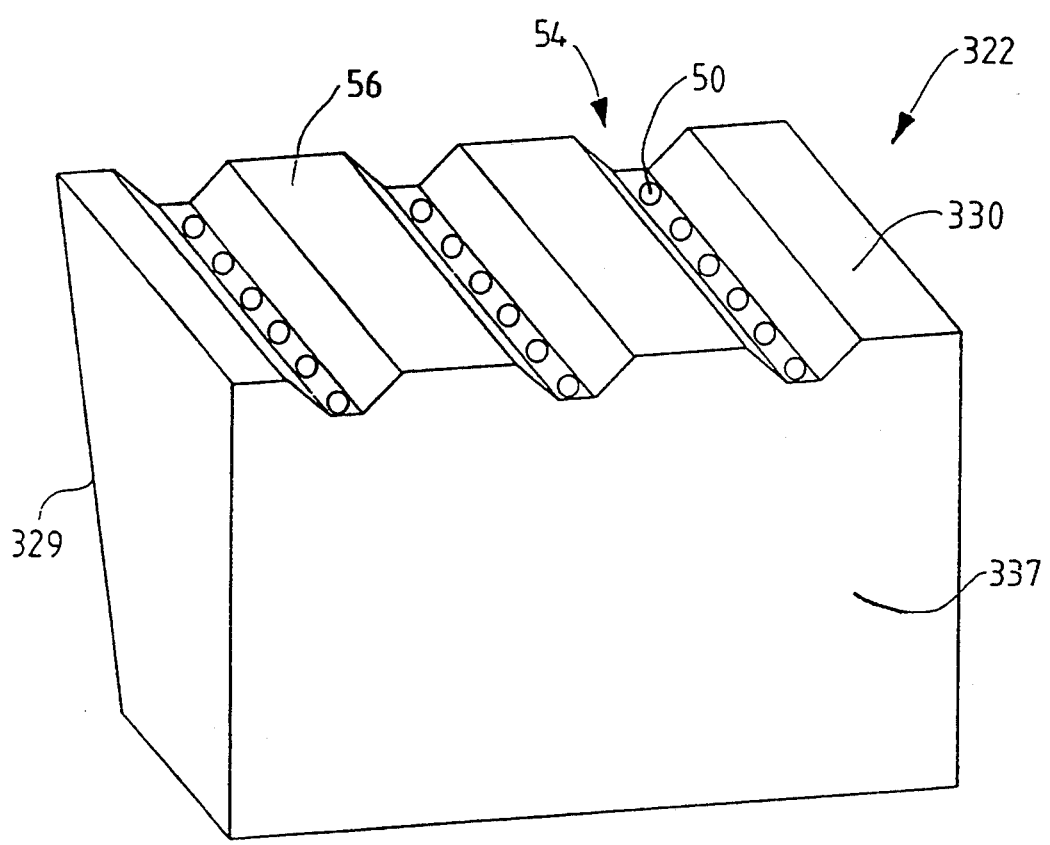
FIGS. 5 and 6 are schematic enlarged views of the barrier walls in particle chambers according to other further embodiments of the present invention.
Figure 6:
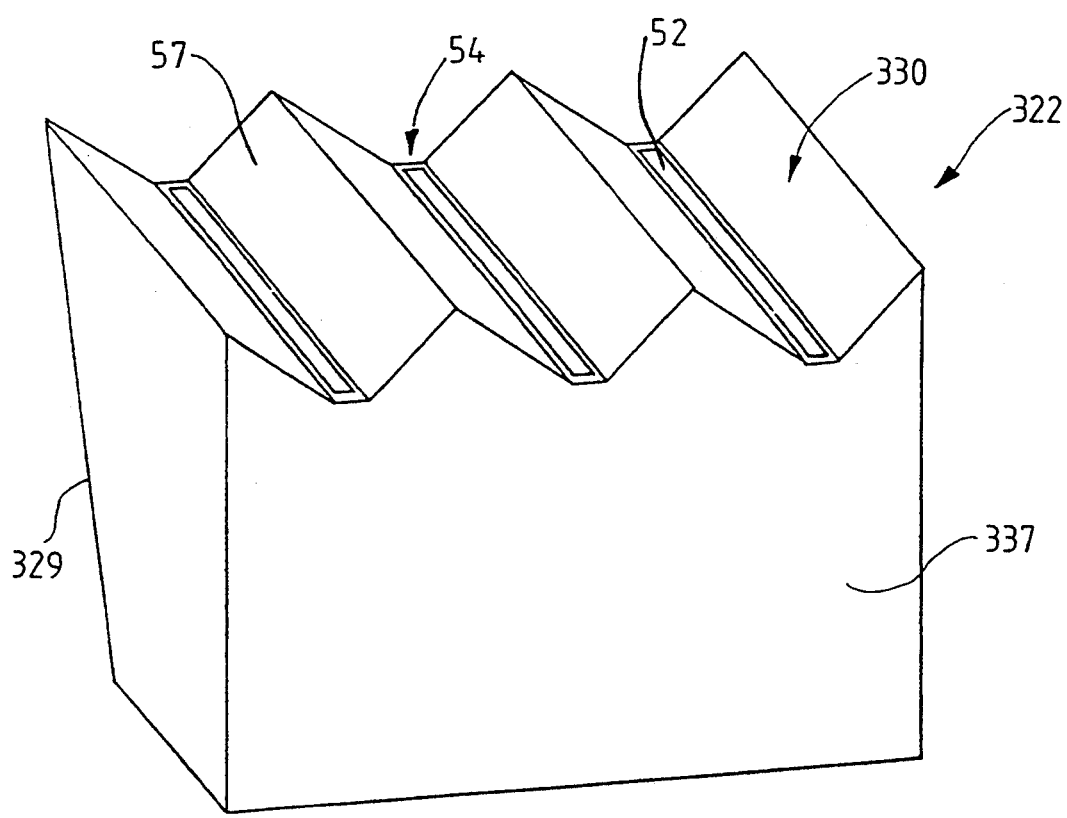

FIGS. 5 and 6 show enlarged views of the barrier wall 330 of the reactor of FIG. 4. The barrier wall holes 50 in FIG. 5 and slots 52 in FIG. 6 are made in furrows 54 in the refractory layer 56 covering the side walls 337 and the roof 330 of the particle chamber 332.

The particle chamber 322 walls may be made of tube panels, i.e. water or evaporator tubes connected by fins. The furrows 54 in the embodiment shown in FIGS. 5 and 6 are made so as to expose the fins between the water or evaporator tubes. Openings 50 or slots 52 are formed in the fins.

In the embodiment shown in FIG. 6, the barrier wall 330 has ridgelike inclined surfaces 57 between the furrows 54 without any noticeable horizontal plane. Thus all particles flowing down onto the barrier wall 330 are guided towards the slots 52 in the bottom of the furrows 54. Particles are gathered from a cross sectional area which is much greater than the cross sectional area of the slots. Particles are gathered from a cross sectional area at least twice the area of the slots 52. The ridges 57 make it possible to gather and classify particles from a large area without having to increase the size or amount of slots 52.

In other embodiments of the invention, portions of the upper wall (30, 130, etc.) of the particle chamber (22, 122, etc.) may also form guide walls guiding particles towards the opening or slots.

Figure 7:
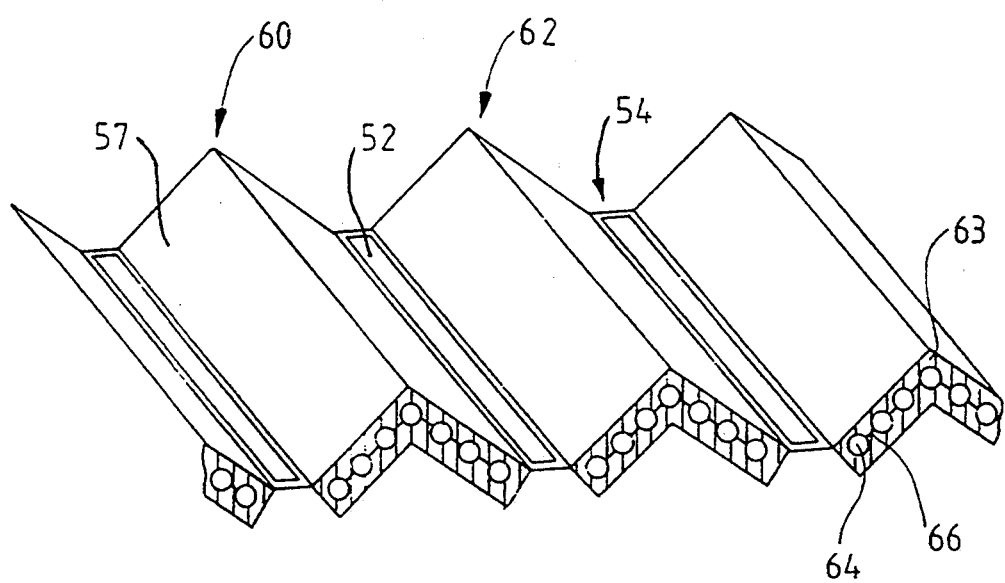
FIG. 7 is a perspective view, partly in cross section, of the barrier wall in FIG. 6.

FIG. 7 is a partly cross sectional view of the ridgelike elements 57 of the barrier wall 330 of FIG. 6. The ridgelike elements 57 are made of tubeplate V-form sections 60, 62 covered with refractory 63. The tubeplate is made of tubes 64 connected by fins 66. The tubeplate sections are disposed parallel to each other, leaving a slot 52 between two adjacent sections 60, 62.

It will thus be seen that according to the present invention a method and apparatus have been provided which effect enhanced heat recovery by precluding larger particles from contacting the heat transfer surfaces.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A method for circulating solid material in a fluidized bed reactor, including a reactor chamber having side walls defining the interior of the reactor chamber and a grid at the bottom of the reactor chamber, a gas discharge opening adjacent the upper end of the reactor chamber, and a fluidized bed of solid particles in said reactor chamber, the fluidized bed having an internal circulation of solid particles, said method comprising the steps of:

(a) classifying solid particles in the internal circulation by providing a particle chamber in the fluidized bed of solid particles, the particle chamber having at least one barrier wall having openings allowing only particles of a size smaller than a predetermined size to flow from the fluidized bed through the barrier wall into the particle chamber;

(b) guiding large objects, having a size bigger than said predetermined size of particles, downwardly in the reactor chamber externally of the particle chamber; and (c) recirculating at least a portion of the particles from the particle chamber into the reactor chamber.

2. A method according to claim 1, wherein heat transfer surfaces are provided within the particle chamber; and wherein step (b) prevents the particles larger from said predetermined size from contacting the heat transfer surfaces; and comprising the further step (d) of recovering heat from the particles in the particle chamber with the heat transfer surfaces.

3. A method according to claim 2, wherein step (a) is practiced by providing the top wall of the particle chamber as the barrier wall.

4. A method according to claim 2 wherein step (b) is practiced by classifying solid particles having a horizontal momentum in the fluidized bed by disposing the particle chamber in the fluidized bed and allowing only particles of a size smaller than a predetermined size to flow into the particle chamber through openings in a primarily vertical wall thereof.

5. A method according to claim 2 wherein step (b) is practiced by allowing only substantially round solid particles having a diameter smaller than about 30 mm to flow into the particle chamber.

6. A method according to claim 2 wherein step (b) is practiced by allowing only substantially oblong solid particles having a width smaller than about 30 mm to flow into the particle chamber, 7. A method according to claim 2 wherein step (c) is practiced by recirculating solid particles from the particle chamber into the reactor chamber by overflow through openings disposed in a wall of the particle chamber.

8. A method according to claim 2 wherein step (c) is practiced by recirculating solid particles from the particle chamber into the reactor chamber through a gas lock disposed in a wall in the particle chamber, and by controlling the gas lock by fluidizing gas flow.

9. A method according to claim 2 wherein step (a) is further practiced by collecting particles from a cross-sectional area of the reactor chamber larger than the total cross sectional area of the openings in the barrier wall.

10. A method according to claim 2 wherein steps (a)-(c) are practiced by introducing particles into the particle chamber at one end thereof and recirculating particles from an opposite end thereof into the reactor chamber, to provide a suitable residence time for the particles and a good mixing of particles in the particle chamber before recirculating the particles into the reactor chamber.

11. A method according to claim 1 wherein the chamber also has an external circulation of particles, and further comprising the step of reintroducing externally circulating particles into the reactor chamber through the particle chamber.

12. A method according to claim 1 wherein step (a) is further practiced by collecting particles from a cross-sectional area of the reactor chamber larger than the total cross sectional area of the openings in the barrier wall.

13. Apparatus for circulating solid material in a fluidized bed reactor, comprising:

a reactor chamber, having side walls defining the interior of the reactor chamber and a grid at the bottom of the reactor chamber;

gas discharge opening adjacent the upper end of the reactor chamber;

a fluidized bed of solid particles in said reactor chamber, the fluidized bed having an internal circulation of solid particles;

a particle chamber disposed in the fluidized bed of solid particles, said particle chamber, having a barrier wall provided with openings preventing solid particles of a size bigger than a predetermined size to flow from the reactor chamber into the particle chamber; and said particle chamber further comprising a wall provided with at least one opening for recirculating particles from said particle chamber into said reactor chamber.

14. Apparatus according to claim 13 further comprising heat transfer surfaces disposed in said particle chamber.

15. Apparatus according to claim 14, wherein said particle chamber is disposed on the bottom of said reactor chamber, and a part of a side wall in said reactor chamber forms a side wall of said particle chamber.

16. Apparatus according to claim 14, wherein the particle chamber is disposed on the bottom of said reactor chamber, and a part of a partition wall in said reactor chamber forms a side wall of said particle chamber.

17. Apparatus according to claim 14, wherein said barrier wall is disposed on top of said particle chamber.

18. Apparatus according to claim 14, wherein said barrier wall is disposed on top of said particle chamber and is substantially horizontal.

19. Apparatus according to claim 14, wherein said barrier wall is disposed on top of said particle chamber and is inclined to facilitate downward flow of large objects along the barrier wall.

20. Apparatus according to claim 14, wherein said openings in said barrier wall are slots having a width less than 30 mm.

21. Apparatus according to claim 14, wherein said openings in said barrier wall are holes having a diameter less than about 30 mm.

22. Apparatus according to claim 14, wherein said openings are formed in furrows in a refractory lining covering said barrier wall.

23. Apparatus according to claim 13, wherein said barrier wall is made of water tubes connected by fins and the openings in the barrier wall are formed in the fins.

24. Apparatus according to claim 13, wherein said barrier wall is made of water tubes connected by fins and wherein said openings in the barrier wall are made by bending two adjacent water tubes apart to form a slot.

25. Apparatus according to claim 13, further comprising means for externally circulating bed material, including an inlet for reintroducing externally circulating solid bed material to the particle chamber.

26. Apparatus according to claim 13, wherein said openings are formed in furrows in a refractory lining covering said barrier walls.

* * * * *